July 22, 1930.  W. J. CAYWOOD  1,771,288
STALK CUTTER
Filed July 24, 1929   3 Sheets-Sheet 1
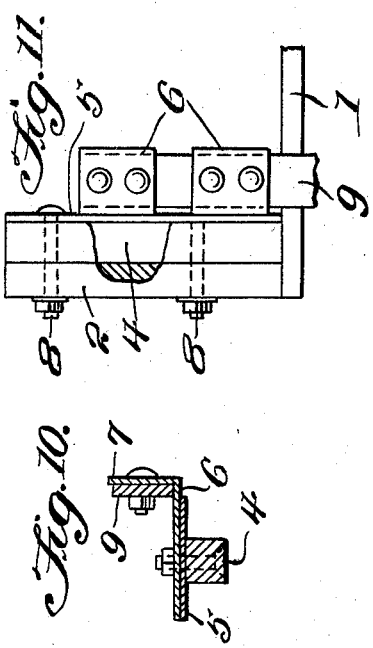
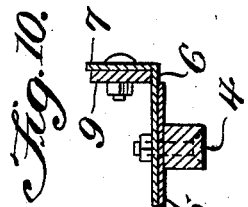
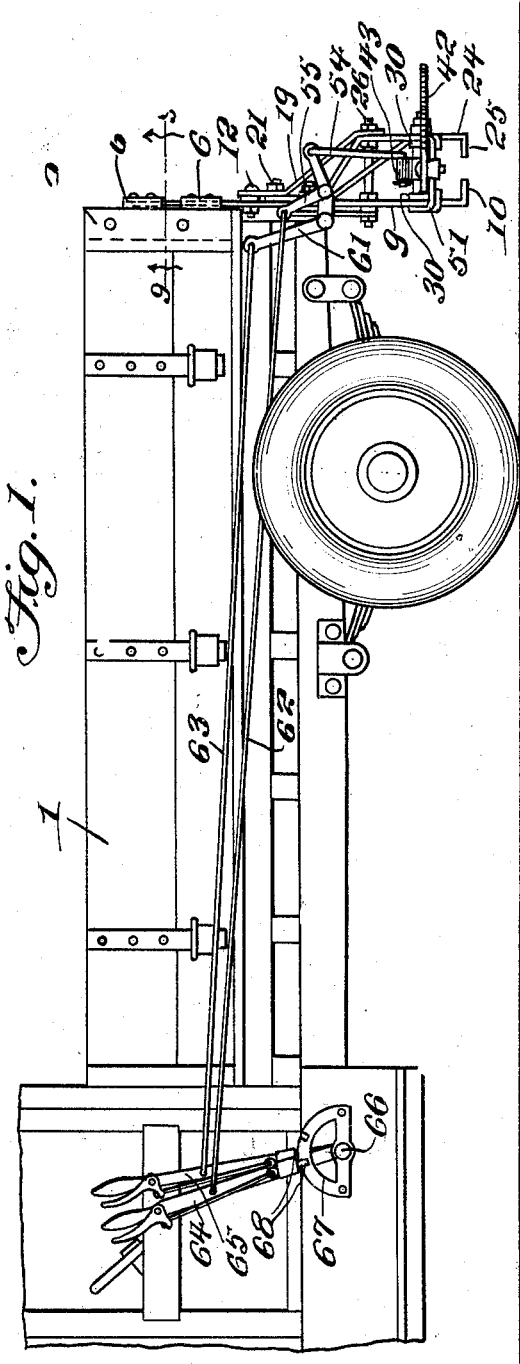
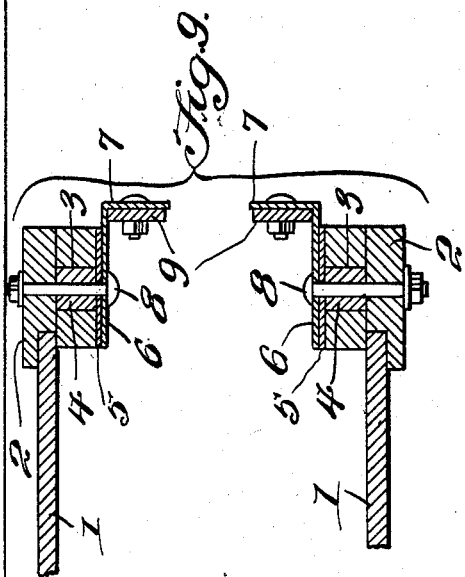
Willis J. Caywood
INVENTOR
BY Victor J. Evans
ATTORNEY
WITNESS: J. T. L. Wright

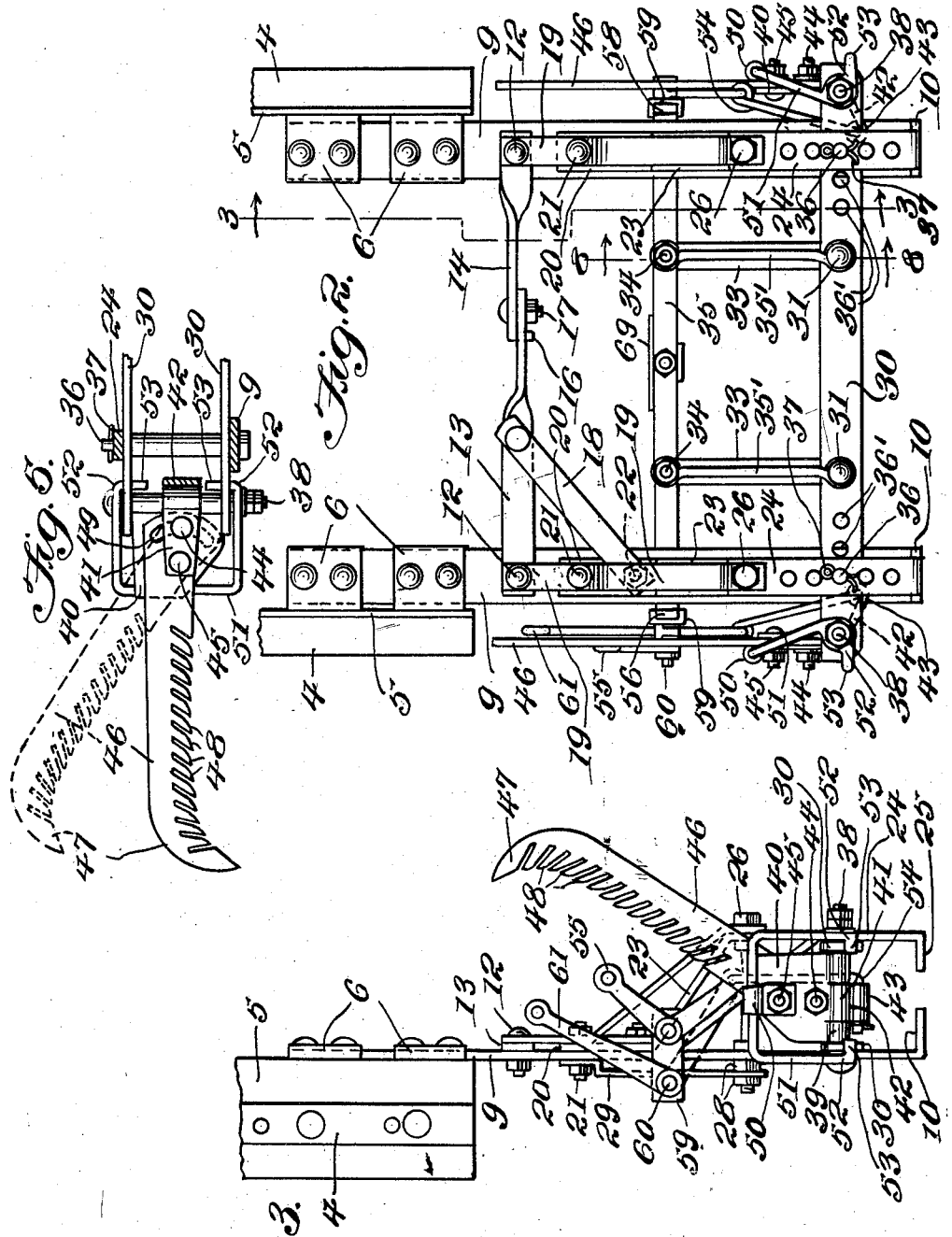

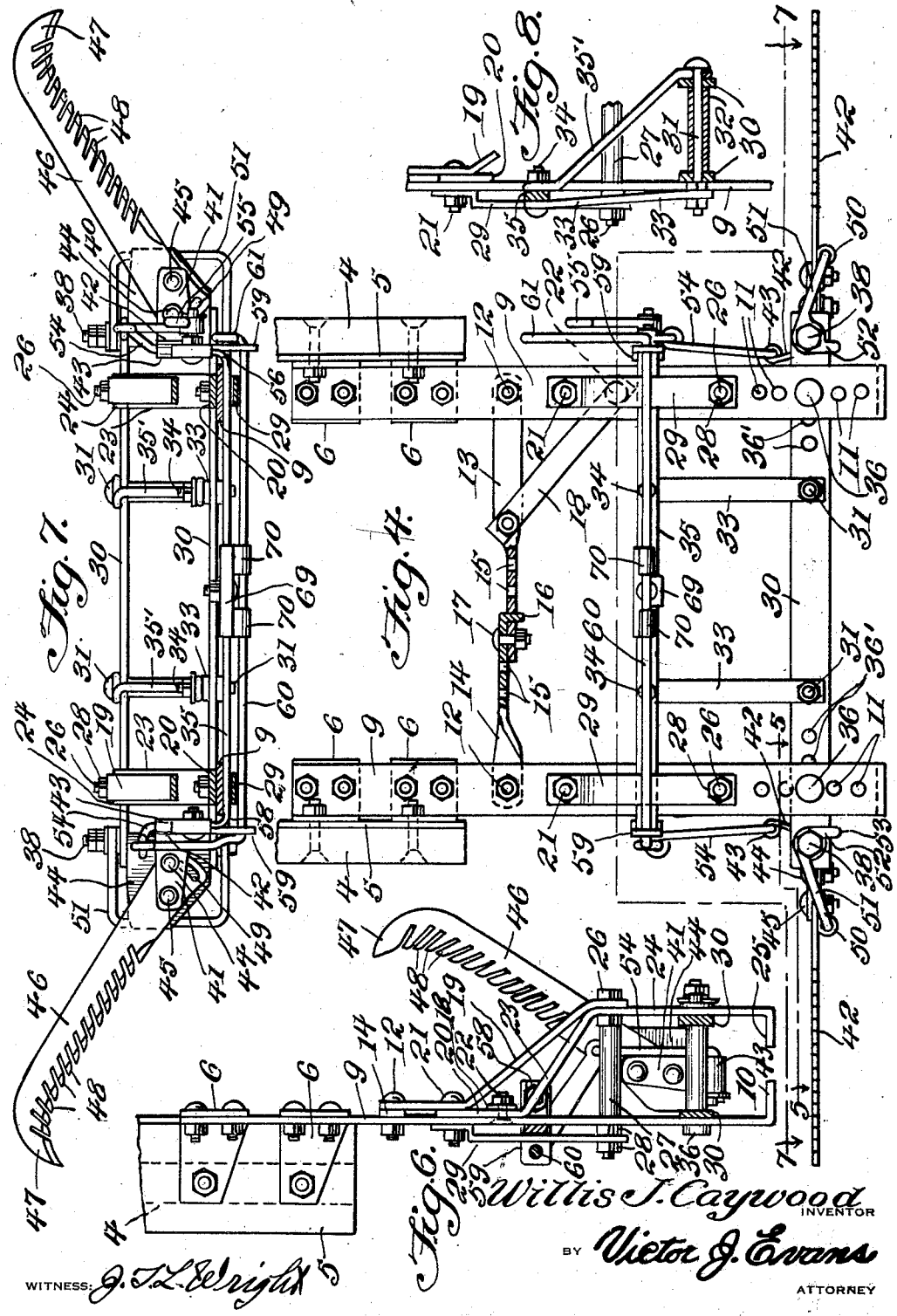

Patented July 22, 1930

1,771,288

UNITED STATES PATENT OFFICE

WILLIS J. CAYWOOD, OF RAYMOND, KANSAS.

STALK CUTTER

Application filed July 24, 1929. Serial No. 380,652.

My present invention has reference to novel but comparatively simple means for cutting corn or like stalks in fields preparatory to the plowing of the field for the sowing of wheat or the like therein, the primary object of the invention being the provision of a means for this purpose which may be removably supported in the tail gate guides at the rear of a truck body, and which includes a pair of cutting knives that may be vertically adjusted to properly engage with the stalks to be cut, together with lever operated means operable from the driver's seat for swinging either of said knives to a horizontal position when the stalks are to be cut or to a vertical position and alongside of the body of the truck when the truck is traveling to or from its work.

A further object is the provision of a means for this purpose in which the cutting knives are swingably secured upon their supports, so that the same may be arranged at desired angles, means to permit of the vertical adjustment of the knives and the supports therefor, together with the frame structure for the supports which is of a laterally adjustable nature, whereby the frame may be arranged upon and secured to the end gate posts of trucks or like vehicles of varying widths.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of a motor propelled truck equipped with my improvement.

Figure 2 is a rear elevation of the improvement with the knives in vertical or inactive position.

Figure 3 is an end view of the device disclosed by Figure 2.

Figure 4 is a view looking toward the reverse face of the device as disclosed by Figure 2, parts being in section and also the knives being swung to horizontal or operative position.

Figure 5 is a sectional view approximately on the line 5—5 of Figure 4.

Figure 6 is a sectional view approximately on the line 6—6 of Figure 2.

Figure 7 is a sectional view approximately on the line 7—7 of Figure 4.

Figure 8 is a detail sectional view approximately on the line 8—8 of Figure 2.

Figure 9 is a sectional view approximately on the line 9—9 of Figure 1.

Figure 10 is a sectional view through one of the side members of the frame.

Figure 11 is a rear elevation looking toward one of the corners of the vehicle, parts being broken away and parts being in section.

In certain figures of the drawings I have illustrated a motor propelled truck body 1. The body 1 is provided with the usual corner posts 2 having their confronting faces provided with the guide openings 3 for the end or tail gate, the posts 2 being also provided on their inner edges with the guide grooves for the removable side boards of the truck body.

In carrying out my invention I make use of a frame that is of metal. As a matter-of-fact, all of the parts constituting my improvement, except the slide blocks 4 which are received in the grooves 3 are of metal, the blocks 4 being preferably of wood. The blocks 4 have on their outer faces metal reinforcing strips 5 which are of a materially greater width than that of the said blocks, the width of the strips or plates 5 corresponding to that of the inner faces of the posts 2. On the outer face of each of the plates 5 there are secured the inner plates or arms 6 of angle members. The outer angle elements of the members 6 are indicated by the numeral 7 in the drawings and these elements are directed toward each other. The securing means for attaching the blocks and the plates 5 and 6 to the posts 2 are in the nature of bolts 8 which are engaged by suitable nuts, and by this simple arrangement it will be noted that the angle plates which form the side members of the frame construction of the improvement may be readily attached to or removed from the grooved corner posts of the truck body. Other and shorter bolts, similar to the bolts 8, secure the blocks or tongues 3 to the plates 5 and 6. The plate members 6 extend a suitable distance beyond the plates 5 and beyond the corner posts 2 and the inwardly directed angle ends of the said members 6 have secured thereto preferably by short bolts engaged by nuts the depending vertical arms 9 of the improvement. The side members 9 of the frame have their lower ends outwardly directed or flanged, as at 10, and above these flanges the said members 9 are provided with series of spaced vertically disposed apertures 11. The side members of the frame at a suitable distance below the blocks 4 have secured thereto by removable means 12 the combined brace and spacer means for the said vertical members of the frame. The securing means 12 is preferably in the nature of short nuts which are engaged by bolts and the combined means for the frame comprises two plates 13 and 14, respectively. These plates are given a half twist so that the confronting faces thereof are arranged horizontally and are in lapping relation. These portions of the plates 13 and 14 are provided each with spaced series of apertures 15, and the end of the said plate 13 has a hooked end 16 to be received in one of the apertures in the plate 14. Designed to be received in alining apertures in the said plates 13 and 14 there are bolt members 17 which are engaged by suitable nuts. By this arrangement it will be noted that the side members of the frame are suitably braced and spaced away from each other and likewise by this arrangement it will be noted that the frame may be widened or narrowed to permit of the same being arranged upon different widths of truck bodies. There is preferably an angular brace plate 18 between the member 13 and one of the side frame members 9.

The securing means 12 for the elements 13 and 14 pass through one of the straight ends of vertically disposed angle brace members 19. The straight ends of the angle brace members 19 overlie the straight upper ends of brackets 20 and there is passed through the ends of the angle braces and brackets suitable securing means 21, also in the nature of short bolts engaged by nuts. The inner end of the angle brace plate 18 also has its securing means 22 passing through the said straight upper portion of one of the brackets 20 and one of the side members 9 of the frame. Each of the brackets has, from its said straight portion an outwardly directed angle part 23 and from thence the said brackets are formed with straight extensions 24 that are disposed in a plane with but, of course, spaced from the frame members 9. The lower ends of the said parts 24 of the brackets are inwardly directed, as at 25, and these portions or flanges 25 are disposed opposite the outwardly directed flanges 10 on the ends of the frame members 9. The outer face of the lower and straight portions 24 of each of the brackets is provided with a plurality of openings designed to register with the openings or apertures 11 in the side members 9 of the frame and the straight ends of the angle braces 19 which overlie the outer portions of the straight faces 24 of the brackets have passed therethrough, as well as through the said brackets and through the frame members 9 comparatively long bolts 26. These bolts may pass through sleeve members 27 or the said bolts may be threaded throughout their length and have screwed thereon nuts which contact with the inner faces of the brackets 24, the outer faces of the frame members 9, as well as the inner faces of the said frame members. Bolts which contact with the inner faces of the frame members 9 are indicated by the numeral 28 and these bolts provide spacer members for vertically disposed guide plates 29 whose lower ends have openings to receive the bolts 26 therethrough and whose upper ends are offset and secured to the inner faces of the frame members 9 by the securing means 21. The bolts 26 and the sleeves thereon sustain the brackets 24 in proper spaced relation with respect to the members 9 of the frame and the purpose of the guide plates 29 will be presently set forth.

The brackets 24, being fixedly connected to the end members 9 of the frame form the said members with lower forked portions that have arranged therebetween the support for the knives. The portion of the support received through the forked ends of the frame comprises two inner and outer spaced plates or bars 30, respectively. The bars 30 are retained in proper spaced relation through the medium of bolts. These bolts are, of course, engaged by nuts and the inner bolts for distinction are indicated by the numeral 31. These bolts pass through spacer sleeves 32 whose ends contact with the confronting faces of the bars 30, the said bolts also passing through the lower ends of vertically directed plates or strips 33 whose upper ends are secured by bolts 34 to the upper and transverse plate or bar 35 of the support. The bar 35 is guided through the openings between the guide strips 29 and the inner faces of the members 9. The bolts 34 are, of course, engaged by suitable nuts and these bolts pass through the upper eyes and angle brace rods 35 for the support. The brace rods have their lower ends also formed with eyes through which pass the bolts 31.

The plates 30, constituting the lower elements of the support are provided with spaced series of transverse longitudinally arranged openings 36 that are designed to be brought to register with one of the series of openings or apertures provided upon the outer portion 24 of the forked lower end of the frame members and with any one of a series of similar openings in the members 9 of the frame and there is passed through these alining openings the shanks of headed studs 36, the said shanks having their outer ends provided with openings for the reception of cotter pins or like elements 37 for holding the support vertically adjusted on the frame, or the frame members laterally adjusted with respect to the support.

The outer or end bolts arranged between the spaced plates that comprise the bottom of the support are in the nature of pivot elements but, are, of course, engaged by suitable nuts. These pivot bolts are indicated in the drawings by the numeral 38. The pivot bolts 38 pass through barrels 39 formed on the inner corners of plates 40. Between the rounded portions or barrels 39 of each of the plates 40 there is arranged for slight contact with the pivot bolts 38 the concaved portion 41 of a metal plate or strip. The inner end of each of these strips 42 is arranged at an angle with respect to the body of the strip and merges into a rounded portion that provides an eye of a barrel 43. The body 42 of each of the strips overlies the respective plates 40, and this body is provided with two spaced openings that register with similar openings in the plate 40 and there is passed through these openings an inner binding element in the nature of a bolt 44 which is engaged by a suitable nut and an outer pivot element 45 which is also in the nature of a bolt that is engaged by a nut. Each of the pivots 45 secures between the plates 40 and the strips 42 the inner and non-toothed end portion of a knife cutter 46. Each of the knives or cutters 46 has its outer end hooked, as at 47, and its inner edge sharpened and kerfed to provide spaced sharpened teeth 48. The inner end of each of the knife blades 46 is provided with an arcuate opening 49 struck from the opening through which the pivot 45 passes and through this opening the binding element 44 is received. It will be apparent that by adjusting a nut on the bolt 44 the knife blades 46 may be swung and sustained at desired angles with respect to the plates 40 and strips 42 and consequently with respect to the frame-like support for the knives. The nuts for the pivot bolts secure on the under face of the plates 40 clips 50 that engage and hold against the under face of the said plates 40 the outer or connecting elements of substantially U-shaped rods 51. The parallel side members of the U-shaped rods 51 have their ends widened and provided with openings for the reception of the pivot bolt 38 and from the said widened portions the substantially U-shaped rods are formed with angle and downwardly directed extensions 52 that merge into inwardly directed ends or arms 53, the said arms designed to underlie and contact with the lower edges of the plates 30 of the lower member of the knife supports when the knives are in horizontal or active position.

The eyes or barrels 43 of the metal strips 42 receive therethrough the offset or angle lower ends of links 54, respectively, and one of these links has its upper end loosely connected to a bell crank lever 55 that is pivotally supported on one of the angle or offset ends 56 of the upper longitudinal bar 35 of the support. The second angle end 57 of the said bar or plate 35 is also offset, as at 58, and to the said angle or offset ends of the element 35 there are secured the cross sectionally U-shaped outer portions of inwardly directed short plates in the nature of fingers 59, the securing means for one of the fingers being in the nature of a pivot for the bell crank lever 55. The plates or fingers 59 are provided with alining openings whose walls afford bearings for a rod in the nature of a shaft 60, the said shaft having one of its ends offset or arranged at an angle and loosely connected to the link 54 for the second knife or cutter member 46, or rather to the barrel end of the strip 42 for the said knife member. Obviously in lieu of forming the end of the shaft with the offset or cranked portion an angularly disposed arm may be fixed to the said end of the shaft for pivotal engagement with the said link. The second end of the shaft is either offset in a vertical direction and at an outward angle or may have secured thereto an arm 61 arranged in the same plane but disposed inward of the upstanding or vertical arm of the bell crank lever 55 and disposed inwardly with respect to the plane of the said bell crank lever 55. There is pivotally connected to the ends of the bell crank lever 55 and to the offset end or arm 61 of the shaft 60 rods 62 and 63 respectively and these rods are directed along one of the sides of the truck body 1, and have their ends connected respectively to levers 64 and 65. The lower end of each of the levers 64 and 65 is pivotally secured, as at 66, to the lower or supporting elements for arched and notched racks 67 and each of the levers 64 and 65 is provided with a handle operated spring influenced dog 68 to engage in either of the spaced notches in the respective arched racks 67.

There is centrally fixed to the inner face of the upper member 35 of the blade or cutter support a plate 69 provided on its inner face with rolled portions 70 that afford central bearings for the shaft 60.

The construction and operation of improvement will, it is thought, be understood and appreciated by those skilled in the art to which such invention relates when the foregoing description has been carefully read in connection with the accompanying drawings. It will be noted that by swinging either of the levers 64 or 65 to bring the spring influenced dogs 68 into one of the notches of one of the racks 67, the shaft for the bell crank lever operated by the swinging of said levers will throw either one of the cutting blades 46 to its horizontal or active position or to its vertical or inactive position. The blades may be arranged at any desired angle with respect to the support by the simple adjustment of the nuts or bolts 44. The blade support may be retained at vertical adjustments on the frame by simply passing the bolt members 36 through desired alining openings in the forked lower end of the frame. The frame may be widened so that the device may be arranged upon various widths of trucks or similar bodies, by simply unscrewing the bolt from the nut 17 and by arranging the bolts 36 in the desired alining openings 36 in the lower plates 30 of the knife blade support, while the device as a whole may be easily attached to or removed from the guides in the end corner posts of the truck body. Also it may not be found necessary to employ the securing bolts for holding the blocks or tongues 4 in the grooves of the corner posts, as the weight of the frame and support may be found amply sufficient for sustaining the device upon the body without liability of free upward movement.

It is believed that further detailed description will not be required.

Having described the invention, I claim:

1. A stalk cutter including a frame designed to be removably secured to the rear of a truck or like vehicle, a knife blade support vertically and laterally secured to the frame, knife blades pivotally secured to the ends of the support, and lever operated means for swinging and sustaining the knife blades in active horizontal position or inactive vertical position.

2. A stalk cutter including a frame designed to be removably secured to the rear of a truck or like vehicle, a knife blade support vertically and laterally secured to the frame, knife blades pivotally secured to the ends of the support, means for angularly adjusting the cutter blades on the support, and lever operated means for swinging and sustaining the knife blades in active horizontal position or inactive vertical position.

3. A stalk cutter designed to be removably attached to the rear of a motor propelled truck or like body, in which said body has its corner posts grooved for the reception of the end gate, said stalk cutter including a frame that comprises said plates, blocks in the nature of tongues on said side plates to be received in the grooves on the posts, removable means for securing the tongues in said grooves, means spacing and adjustably connecting the plates of the frame, guides on the frame, a knife blade support including lower spaced plates and an upper plate that is received through the guides of the frame, means for securing the support to the frame to sustain the support vertically adjusted on said frame or to hold the support on the frame when the frame members are adjusted with respect to each other, cutter blades pivotally secured on the outer ends of the support, substantially U-shaped members having offset ends pivoted to the supports for underlying the support and the knife members for sustaining the same when in horizontal and active position and lever operated means for swinging and sustaining the knife members in their said active position and for likewise swinging and sustaining the said knife members to vertical or inactive position.

In testimony whereof I affix my signature.

WILLIS J. CAYWOOD.